United States Patent [19]

Lemanczyk et al.

[11] Patent Number: 4,784,694
[45] Date of Patent: Nov. 15, 1988

[54] COMPOSITIONS OF POLYMER SYSTEMS, AND THEIR USE FOR EXAMPLE IN HYDRAULIC FRACTURING

[75] Inventors: Richard Lemanczyk, Saint-Heand; Jacques Desbrieres, Saint-Etienne, both of France

[73] Assignee: Etudes et Fabrication, St. Etienne, France

[21] Appl. No.: 563,137

[22] Filed: Dec. 19, 1983

[30] Foreign Application Priority Data

Dec. 21, 1982 [FR] France .............................. 82 21474

[51] Int. Cl.⁴ ........................... C08L 1/00; C08L 5/00
[52] U.S. Cl. .................................... 106/203; 106/208
[58] Field of Search ................ 106/181, 194, 208, 203

[56] References Cited

U.S. PATENT DOCUMENTS

| 3,740,360 | 6/1973 | Nimerick ............................. 106/208 |
| 4,018,286 | 4/1977 | Gall et al. ............................ 166/294 |
| 4,265,673 | 5/1981 | Pace et al. ........................... 106/181 |
| 4,369,124 | 1/1983 | Elphingstone et al. ............. 106/208 |
| 4,378,049 | 3/1983 | Hsu ..................................... 106/194 |
| 4,396,433 | 8/1983 | Brandt et al. ....................... 106/194 |

Primary Examiner—Theodore Morris
Attorney, Agent, or Firm—Stephen A. Littlefield

[57] ABSTRACT

The invention relates to the improvement by a chelating agent of polymer compositions usable in particular in the hydraulic fracturing of underground formations close to a drilling well. The chelating agent is a compound such as fumaric acid, maleic acid or thiourea. Substantially shorter crosslinking time; use possible even with sea water or a brine.

17 Claims, 2 Drawing Sheets

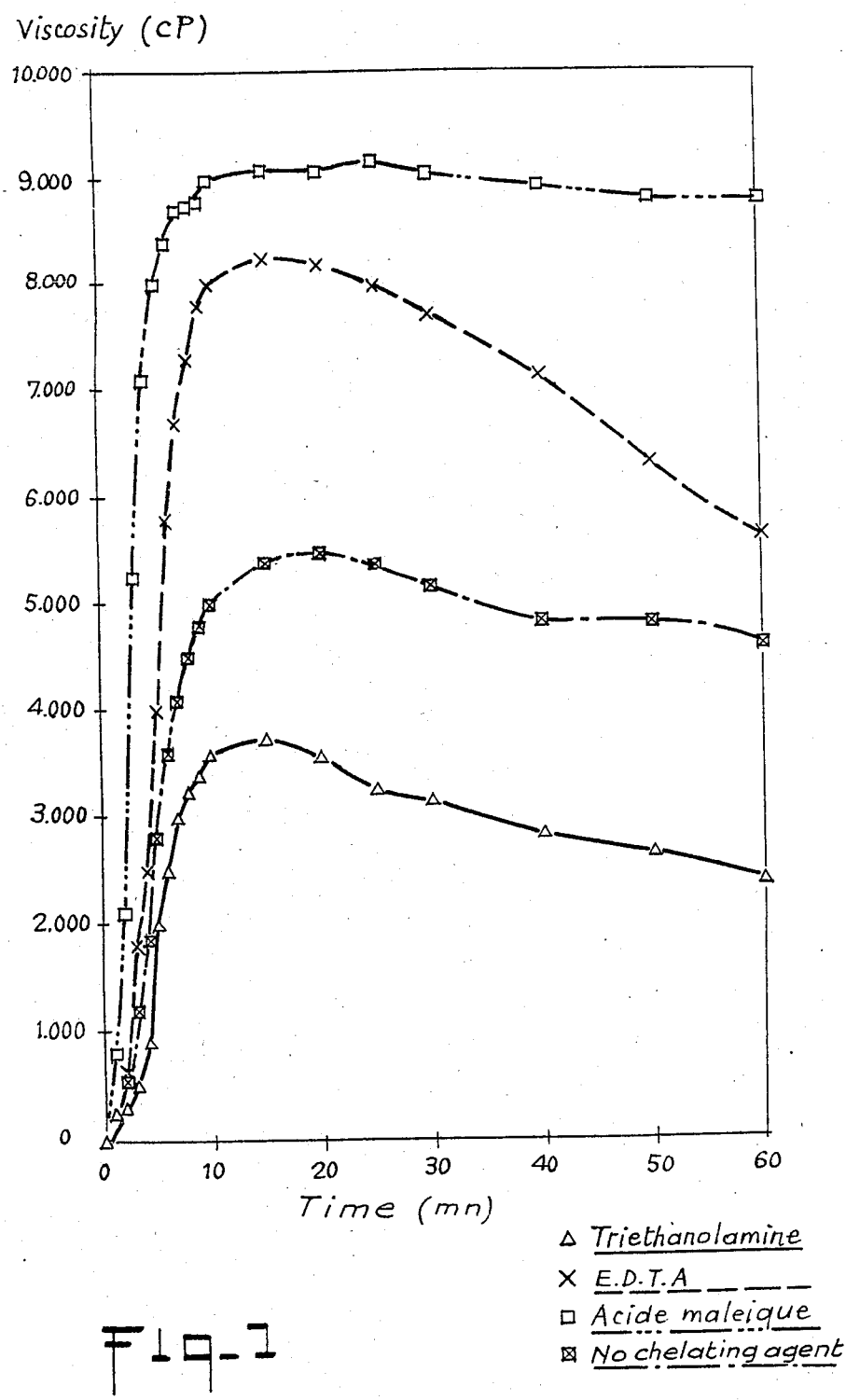

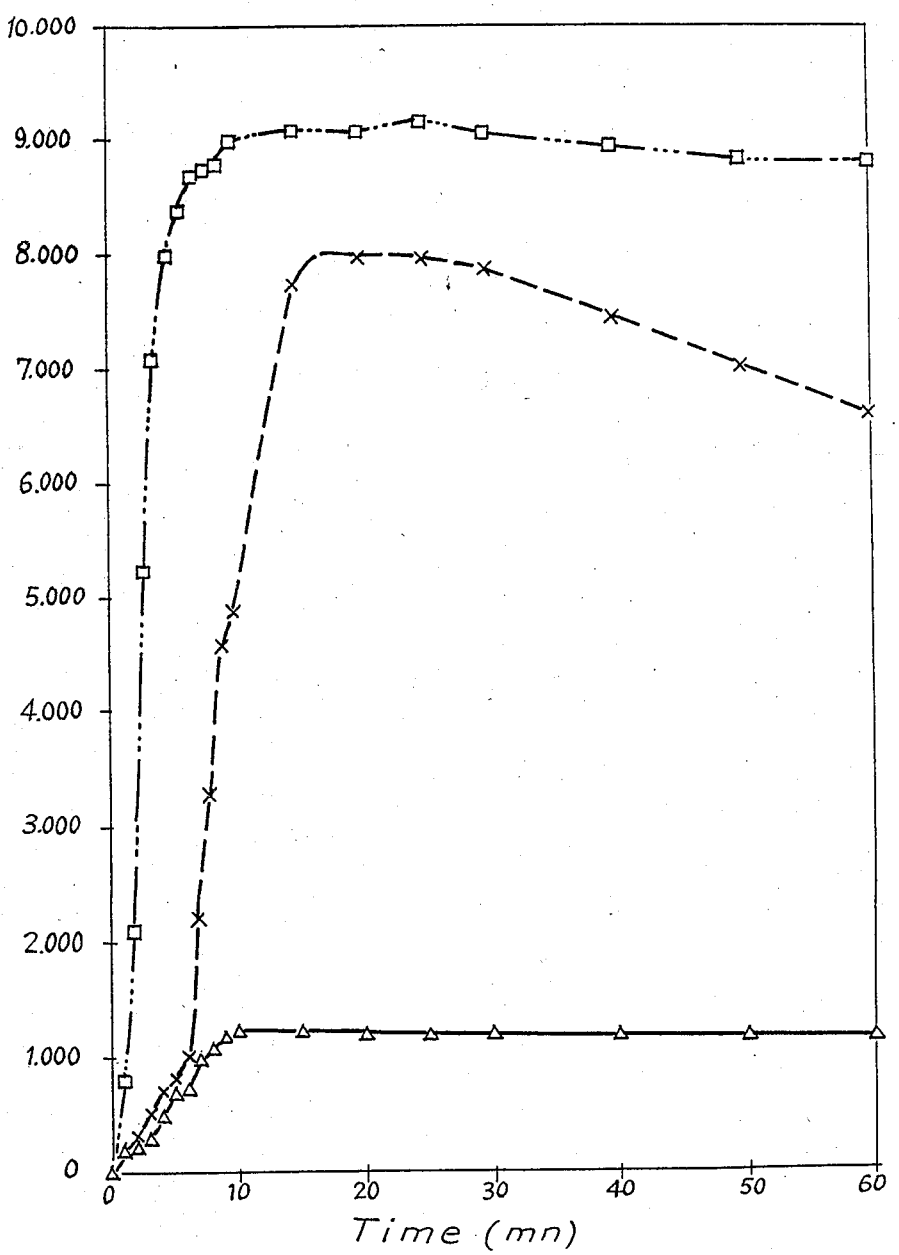
Fig_2

COMPOSITIONS OF POLYMER SYSTEMS, AND THEIR USE FOR EXAMPLE IN HYDRAULIC FRACTURING

The invention relates to the field of compositions of polymer systems particularly usable in the hydraulic fracturing of underground formations close to a drilling well.

Hydraulic fracturing is a technique used to increase the productivity of a well by effectively increasing the conductivity of the treated formation. A fracture is created by pumping a fluid at very high pressure into the zone of interest. The fracture is then propagated to the desired extent by pumping more fluid, sufficient pressure being required to overcome the in situ closure stress of the formation.

The fluids most commonly used in hydraulic fracturing are aqueous solutions of a polymer. Important properties of such fluids are: high viscosity, ability to transport the propping agent (sand, fritted bauxite, . . . ) into the fracture, temperature stability, low loss of load through friction during pumping and little fluid loss through the formation.

The most common polymer used is a polysaccharide (and in particular galactomannan) or its derivatives which, when blended with certain chemical additives, produces a composition for convenient application in field operations. The additives present in such compositions determine the manner in which the polymer will react in solution and hence will ultimately affect the properties of the gelled solution (i.e. the actual fracturing fluid). In continuous mixing functioning, in the treatment of shallow wells or at very high pumping speeds, it is necessary to achieve a short gelation time (between 1 and 2 mins.) and the composition also needs to be usable in fresh water as well as in brine or sea water. Moreover, in offshore hydraulic fracturing operations, where the polymer system is added to the mix water and immediately pumped in continuous manner, it is necessary to have a rapid hydration (i.e. solution) in order to allow crosslinking to occur before the fluid reaches the fracture.

Crosslinked solutions of galactomannans are used in drilling fluids, fracturing fluids, to plug underground formations, or in gelled aqueous compositions used as explosives. A wide range of metallic ions can be used as crosslinking agents, e.g. aluminium, arsenic, boron, transition metals, lanthanides and other like ions.

To obtain a crosslinked gel, two consecutive steps are necessary.

The first step consists in the hydration of the polymer macromolecular chain, that is to say the spreading out of the polymeric chain from an initial "coil" shape to an extended configuration when the polymer is in a solution. This is achieved by association of the water molecules with the polymer molecules, when the gum is uniformly dispersed in the aqueous medium. The result of the hydration is a thickening of the solvent. Hydration time is defined as being the time required to reach 90% of the maximum viscosity of the uncrosslinked fluid.

The second step is the crosslinking reaction. The crosslinking of a polymer consists in bonding adjacent macromolecules together to build up a tridimensional network. This results in a very high viscosity and therefore in the required propping agent transport properties. The crosslinking or gelling time is defined here as the time required to reach a Brookfield viscosity of 1,000 cPs.

The sequence of these two reactions is very important and it is impossible for crosslinking to occur before hydration. The parameter controlling this sequence is the pH development. For guar gums and their derivatives, hydration is best in a slightly acidic medium and the pH range for crosslinking depends on the metallic crosslinking agent. Depending on the pH of the solution, a firm or a soft gel can be obtained within reaction times which can vary widely.

If the systems in question are to be used in a continuous mix method, it is necessary to introduce buffers in order to allow the correct sequence of the hydration and crosslinking reactions: for guar gum derivatives, an acid buffer allows hydration to take place and subsequent crosslinking occurs when the medium becomes basic due to the action of a delayed base (when using a borate type crosslinking agent).

It is therefore already known to use for hydraulic fracturing polysaccharide derivatives which are first subjected to hydration to modify the configuration of the initially coil-shaped polymeric chain, then to crosslinking (using a crosslinking agent such as a borate, titanium, zirconium ion, etc.) so as to obtain a gel having adequate fluidity characteristics as well as adequate elasticity characteristics and being capable of adequately transporting the propping agents.

The currently used compositions are made up of four constituents.

The first constituent consists of the polymer, generally a hydroxy-propyl guar gum (polysaccharide derivative or "PSD").

The second constituent consists of a crosslinking agent such as defined above.

The third constituent consists of a buffer capable of lowering the pH to a slightly acid pH, of the order of 4.5 so as to allow hydration for a period not exceeding 1 minute. The most common buffer used is an acid buffer consisting in known manner of a mixture of citric acid and an acetate.

The fourth constituent consists of a "delayed" base, i.e. a base of which the action is delayed by the fact that it dissolves very slowly in an aqueous medium. This fourth constituent permits a pH 8.5, after about 3 minutes to be obtained, which causes cross-linking since crosslinking starts at about pH 8, and develops above pH 8.

Two main methods of use of such compositions are currently known.

The first technique is a batch process which consists in using successively, in a discontinuous manner, the compositions which are themselves prepared in a discontinuous manner. Such a technique requires very large tanks, since about 400 m³ of gel are required for an average treatment. Such tanks are for example incompatible with offshore applications.

The second technique consists in a "continuous pumping" process, comprising pumping the water available on site, mixing the above pre-mixed four constituents with that water in continuous manner, then with certain additives such as anti-foaming agents or the like, and pumping the reaction mixture in continuous manner into the well during the same operation. The time available to obtain the gellification is therefore very short, since it is only once gellification is substantially completed that the product is efficient. It is to be noted that the time available to obtain gellification will be shortest that the well is shallow or that the pumping speed is high. In some applications the products currently known require too long a gellation time.

The gellification time is further increased if salt water or a brine is used.

According to the present invention, a chelating agent is added to the four known constituents.

A gelled composition is thus obtained which is based on the same basic polymer, the chemical additives and proportions used being however modified, the essential modification residing in the addition of a chelating agent.

It has been discovered according to the present invention that it is possible to use as chelating agents compounds comprising at least one —COOH, preferably two —COOH groups, and preferably close to a double bond, such as for example fumaric or maleic acid. The best results were obtained with maleic acid. Acids from the family of isoascorbic acid (or erythorbic acid) may also be used, although they are less efficient.

Such acids have never been used to promote crosslinking of a polymer.

On the contrary, U.S. Pat. No. 4,317,735 recommends the use of erythorbic acid to inhibit crosslinking of Xanthan gums at a pH higher than about 1.5 in the presence of ferric ions.

Concentration ranges of the various additives in the compositions according to the invention: (the indicated concentrations are with respect to the polymer concentration.)

citric acid: 2 to 10%
dihydrated trisodium citrate: 0 to 6.25%
dihydrated sodium dihydrogenophosphate: 0 to 6.25%
chelating agent (in particular maleic acid): 2 to 10%
magnesium oxide: 8 to 30%

To achieve a good compromise between hydration of the polymer, gellation time and good rheological properties for the gel, the acid:magnesium oxide ratio should be at least equal to 20% by weight.

The selection of the chelating agents according to the invention proved difficult, because the desired additive was not allowed to interfere with the solubilization of the delayed base, and was itself to be active both in an acid medium and in a basic medium. In fact, as indicated above, the reaction medium should be first acid and then basic. If the properties of the chelating agent develop in a basic medium only, the time necessary for this agent to act would not be sufficient. It was therefore necessary to find additives capable of being active not only in a basic medium but already in the acid medium.

The presence of at least one —COOH group is imperative. Thus, chelating agents like oximes such as dimethylglyoxime of formula:

$$\begin{array}{c} CH_3 \\ \diagdown \\ C-C \\ \diagup \diagdown \\ HO-N \quad CH_3 \end{array} \begin{array}{c} N-OH \end{array}$$

or aminoalcohols such as triethanolamine: $N(CH_2-CH_2OH)_3$ are not suitable. The example of triethanolamine is particularly pertinent in this respect because nitrilotriacetic and $N(CH_2-COOH)_3$ is suitable.

Table I hereinafter gives the formula of the preferred chelating agents according to the invention.

It should be noted that good results are also obtained with thiourea, probably due to the presence of the C=S group.

FIG. 1 represents the curves of the trend of viscosity as a function of time, and clearly shows the advantage of adding specific chelating agents such as maleic acid for example, and in contrast the noxious action of triethanolamine.

FIG. 2 also represents the viscosity/time curves for three specific examples of the invention.

The general formulation of the compositons currently used in the continuous process is kept according to the invention, i.e., the formulations according to the invention also comprise a gellifying agent, an acid buffer for hydration and a delayed base allowing crosslinking. However, the relative quantities of these constituents have been modified and an essential constituent, the chelating agent described above, has been added.

Due to the chelating agent, both the gellation speed and the final viscosity of the gel are improved. The improvements are particularly remarkable when salt water or brines concentrated in calcium divalent ions, magnesium or the like are used.

The aforesaid improvements are of the order of 30 to 40%, which is considerable and unexpected.

The invention therefore permits new applications to compositions for fracturing of which the principle is generally known.

These new application fields are essentially the offshore field or that of zones where only salt water or brines are available.

The crosslinked gel obtained according to the invention may be broken by the same currently used oxidizing agents or enzymes.

The advantages of the invention can be summarized as follows:

shorter crosslinking time than with known products (1 minute at ambient temperature in sea water, instead of about 3 to 4 minutes);

single formulation usable for fresh water, brines, or sea water crosslinking takes place whatever the initial pH, the salinity of the mix water, the nature of the ions contained in said mix water improved prop transport properties in particular during the early stage of gellification; and possibility of using several metallic crosslinking agents whatever the mix water used.

The following examples are given to non-restrictively illustrate the invention.

Mixing procedure and viscometric study

The mix water (solution at 1% of potassium chloride or sea water ASTM D 1141-75) is stirred in an agitator of the "Waring blendor" type (marketed by CHANDLER ENGINEERING Co. TULSA, USA) which is equipped with a digital tachymeter. The initial rotation speed of the motor is 6000 rpm. The crosslinking agent is added in solution to the mix water, then the polymeric system in solid form is added at time T=O (the crosslinking agent may be added in powder form simultaneously with the gellifying agent). The solution is stirred for 1 minute (the rotation speed of the motor is left to decrease) and stirring is then stopped.

The solution is rapidly poured into the cell of an atmospheric viscometer. This apparatus is generally used to measure the consistency and setting time of a cement slurry (a full description of this apparatus with the specifications of the various components can be found in Specification API RPIOB). The geometry of the plate used minimizes the consequences of side effects such as the Weissenberg effect or sliding effect.

EXAMPLES 1 TO 24

Use of maleic acid

The compositions detailed in Table III hereinafter have been prepared and tested according to the above technique.

The polymer used is "PSD" such as indicated above.

This table also shows the obtained viscometric results.

FIG. 2 illustrates the trend of these results as a function of time, for Examples 2, 18 and 24.

EXAMPLE 25

Different chelating agents have been used

The formulation used and the results obtained are given in Table II hereinafter.

Example 26

Concentration ranges of the various salts contained in the mix water

The formulation of the polymeric system used is that given in Example 24.

The various concentration ranges of the salts contained in the mix water which have been tested are as follows:

$Ca^{2+}$: 0 to 0.2 mole/l (0 to 25 g/l of $CaCl_2, 2H_2O$)
$Mg^{2+}$: 0 to 0.15 mole/l (0 to 25 g/l of $MgCl_2, 2H_2O$)
$HCO_3^-$: 0 to 0.01 mole/l (0 to 1 g/l of $NaHCO_3$)
KCl: 0 to 150 g/l
NaCl: 0 to 150 g/l The results remain excellent at least up to the upper limits indicated above.

TABLE I
FORMULA OF THE MAIN CHELATING AGENTS USABLE ACCORDING TO THE INVENTION.

compounds having an ene 1,2-carboxylic group
(the "cis" groups are more efficient than "trans" groups)
- Maleic acid

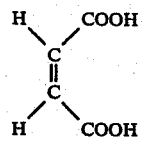

- fumaric acid

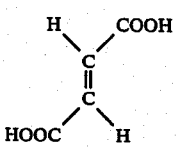

- orthophtalic acid

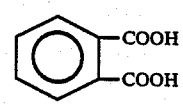

hydroxy carboxylic acids
- tartric acid

TABLE I-continued
FORMULA OF THE MAIN CHELATING AGENTS USABLE ACCORDING TO THE INVENTION.

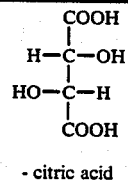

- citric acid

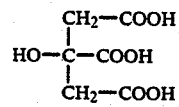

- sulfosalicylic acid (or hydroxy-2 carboxy 1-benzenesulfonic 5)

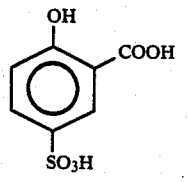

- isoascorbic (or erythorbic) acid

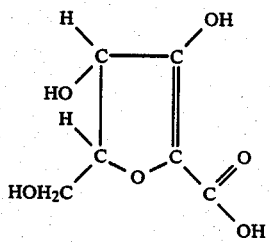

thiourea $(NH_2)_2C=S$
aminocarboxylic acids
- E.D.T.A. ethylene diamine tetraacetic acid

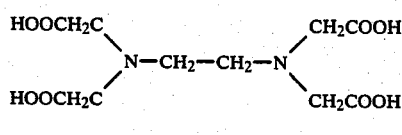

- N.T.A. nitrilotriacetic acid

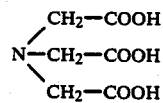

TABLE II
COMPARISON OF THE VARIOUS CHELATING AGENTS

Mix water: sea water A.S.T.M., T = 77° F.
Concentration of the various constituents:

| | |
|---|---|
| - polymer | 74% |
| - citric acid | 3.85% |
| - dihydrated trisodium citrate | 1.5% |
| - dihydrated sodium dihydrogenophosphate | 1.5% |
| - magnesium oxide | 15.3% |
| - chelating agent | 3.85% |

| chelating agent | Time necessary to obtain a viscosity of 1000 cPs | Time necessary to obtain a viscosity of 5000 cPs |
|---|---|---|
| maleic acid | 1 min. 15 s | 2 mins. 45 s |
| fumaric acid | 3 mins. | 4 mins. 45 s |
| tartric acid | 2 mins. 45 s | 3 mins. 55 s |
| sulfosalicylic | 3 mins. | 3 mins. 55 s |

TABLE II-continued
COMPARISON OF THE VARIOUS CHELATING AGENTS

| acid | | |
|---|---|---|
| thiourea | 2 mins. 45 s | 4 mins. |
| E.D.T.A. | 3 mins. 30 s | 5 mins. |
| dimethylglyoxime | 4 mins. | never obtained |
| triethanolamine | 4 mins. 15 s | never obtained |
| no chelating agent | 3 mins. | 10 mins. |

TABLE III

| Examples | polymer (g) | Citric acid (g) | Sodium citrate | Sodium hydrogeno- phosphate | Magnesium oxide (g) | Maleic acid (g) | Time to obtain 1000 cPs | Time to obtain 5000 cPs |
|---|---|---|---|---|---|---|---|---|
| 1 | 2.4 | 0.105 | 0.1 | 0.08 | 0.5 | 0.1 | 3 min | 4 min 30 s |
| 2 | 2.4 | 0.025 | 0.05 | 0.05 | 0.5 | 0.025 | 7 min | never obtained |
| 3 | 2.4 | 0.075 | 0.1 | 0.08 | 0.5 | 0.075 | | |
| 4 | 2.4 | 0.05 | 0.1 | 0.08 | 0.5 | 0.05 | 2 min 20 s | 4 min 45 s |
| 5 | 2.4 | 0.15 | 0.1 | 0.08 | 0.5 | 0.15 | | |
| 6 | 2.4 | 0.20 | 0.1 | 0.08 | 0.5 | 0.1 | | |
| 7 | 2.4 | 0.10 | 0.1 | 0.08 | 0.5 | 0.2 | | |
| 8 | 2.4 | 0 | 0.1 | 0.08 | 0.5 | 0.3 | 3 min 10 s | 5 min |
| 9 | 2.4 | 0.15 | 0.1 | 0 | 0.5 | 0.15 | | |
| 10 | 2.4 | 0.15 | 0.1 | 0.05 | 0.5 | 0.15 | | |
| 11 | 2.4 | 0.15 | 0.1 | 0.08 | 0.5 | 0.15 | | |
| 12 | 2.4 | 0.15 | 0.1 | 0.1 | 0.5 | 0.15 | | |
| 13 | 2.4 | 0.15 | 0.1 | 0.15 | 0.5 | 0.15 | | |
| 14 | 2.4 | 0.15 | 0 | 0.05 | 0.5 | 0.15 | 2 min 45 s | 4 min 45 s |
| 15 | 2.4 | 0.15 | 0.05 | 0.05 | 0.5 | 0.15 | | |
| 16 | 2.4 | 0.15 | 0.1 | 0.05 | 0.5 | 0.15 | | |
| 17 | 2.4 | 0.15 | 0.05 | 0.05 | 0.5 | 0.1 | | |
| 18 | 2.4 | 0.15 | 0.05 | 0.05 | 0.3 | 0.15 | 6 min 30 s | 10 min 20 s |
| 19 | 2.4 | 0.15 | 0.05 | 0.05 | 0.4 | 0.15 | | |
| 20 | 2.4 | 0.15 | 0.05 | 0.05 | 0.5 | 0.15 | | |
| 21 | 2.4 | 0.15 | 0.05 | 0.05 | 0.6 | 0.15 | | |
| 22 | 2.4 | 0.15 | 0.05 | 0.05 | 0.7 | 0.15 | 2 min | 2 min 50 s |
| 23 | 2.4 | 0.125 | 0.1 | 0.1 | 0.5 | 0.125 | 2 min 30 s | 5 min 10 s |
| 24 | 2.4 | 0.125 | 0.05 | 0.05 | 0.5 | 0.125 | 1 min 15 s | 2 min 45 s |

What we claim is:

1. Polymer based crosslinkable compositions for use in the state of crosslinked gels, in particular in the hydraulic fracturing of underground formations, of the type comprising:
   a base polymer
   a crosslinking agent
   an acid buffer, and
   a delayed base
wherein said compositions further comprise a chelating agent selected from the compounds containing at least one —COOH group and thiourea, in a proportion of 2-10% by weight of the polymer.

2. Composition as claimed in claim 1, wherein the base polymer is a polysaccharide polymer.

3. Composition as claimed in claim 1 or 2, wherein the acid buffer consists in a mixture of citric acid and citrate.

4. Composition as claimed in claim 1, wherein the chelating agent is a dicarboxylic acid.

5. Composition as claimed in claim 3, wherein the chelating agent is maleic acid.

6. Composition as claimed in claims 1, wherein the chelating agent is fumaric acid.

7. Composition as claimed in claim 1, wherein the chelating agent is tartric acid.

8. Composition as claimed in claim 1, wherein the chelating agent is sulfosalicylic acid.

9. Composition as claimed in claim 1, wherein the chelating agent is ethylene diamine tetracetic acid.

10. Composition as claimed as in claim 1, wherein the chelating agent is an isoascorbic acid.

11. Process for the preparation of a gel usable in hydraulic fracturing or as a drilling fluid, wherein a composition of claim 1 is mixed by continuous pumping with an adequate quantity of fresh water, or salt water or brine.

12. A process as claimed in claim 11, wherein the crosslinking agent is a metallic ion.

13. A process as claimed in claims 11 or 12, wherein the water used for the mixing is salt water or a brine.

14. A hydraulic fracturing and/or propping process wherein a composition of claim 1 is pumped into a well.

15. Composition as claimed in claim 2 wherein the polysaccharide polymer is a hydroxypropyl guar gum.

16. Composition as claimed in claim 1 comprising, by weight of polymer, 2-10% citric acid, 0-6.25% dihydrated trisodium citrate, 0-6.25% dihydrated sodium dihydrogenophosphate and 8-30% magnesium oxide.

17. Composition as claimed in claim 16 wherein the chelating agent is maleic acid.

* * * * *